United States Patent
Jung

(10) Patent No.: US 6,175,356 B1
(45) Date of Patent: Jan. 16, 2001

(54) REMOTELY CONTROLLED COMPUTER SYSTEM

(75) Inventor: Sung-gon Jung, Suwon-si (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 09/014,420

(22) Filed: Jan. 27, 1998

(30) Foreign Application Priority Data

Jan. 28, 1997 (KR) .................................. 97-2477

(51) Int. Cl.⁷ .............................. G09G 5/08; G09G 5/00
(52) U.S. Cl. ........................ 345/158; 345/169; 345/156
(58) Field of Search .................................. 345/158, 169, 345/156; 348/734; 400/480; 341/22, 24, 26

(56) References Cited

U.S. PATENT DOCUMENTS

| | | |
|---|---|---|
| 4,861,175 * | 8/1989 | Hori et al. ........................... 400/76 |
| 5,187,469 * | 2/1993 | Evans et al. ..................... 340/825.22 |
| 5,233,658 | 8/1993 | Bianco et al. . |
| 5,256,863 | 10/1993 | Ferguson et al. . |
| 5,448,697 | 9/1995 | Parks et al. . |
| 5,457,473 | 10/1995 | Arai et al. . |
| 5,550,556 | 8/1996 | Wu et al. . |
| 5,648,781 | 7/1997 | Choi . |
| 5,877,745 * | 3/1999 | Beeteson et al. ..................... 345/156 |
| 5,973,810 * | 10/1999 | Song .................................. 359/142 |

* cited by examiner

Primary Examiner—Amare Mengistu
Assistant Examiner—Jimmy H. Nguyen
(74) Attorney, Agent, or Firm—Robert E. Bushnell, Esq.

(57) ABSTRACT

An apparatus and method for remotely controlling a PC and a monitor are disclosed, including a remote control having a short key for memorizing an operation sequence and short key setting key for setting the operation sequence to the short key, to output the sequence an OSD picture of the monitor when the user wants it. The user pushes a memorized number using the short key, watching the OSD picture, to execute a PC into a desired state. Accordingly, functions performed through complicated procedures can be controlled by the remote control, and the user can easily use the computer using the remote control even if the user does not know the computer well.

6 Claims, 5 Drawing Sheets

REMOTELY CONTROLLED COMPUTER SYSTEM

CLAIM OF PRIORITY

This application makes reference to, incorporates the same herein, and claims all benefits accruing under 35 U.S.C. §119 from my application entitled *Remotely Controlled Computer System* earlier filed in the Korean Industrial Property office on Jan. 28, 1997, and there duly assigned Serial No. 97-2477 by that Office.

BACKGROUND OF THE INVENTION

1. Field of the Invention

The present invention relates to an apparatus and method for controlling a personal computer (PC) and monitor using a remote control, specifically, to an apparatus and method for controlling a PC and monitor using a remote control, in which a sequence memorizing device is set in the remote control, to sequentially reoperate repeated works at once using a microprocessor in the monitor.

2. Discussion of Related Art

Electronic products generally have various control buttons for controlling their functions. Conventional control buttons are attached to the exterior of the electronic products so that a user should go to the products to use them. This is inconvenient for the user. Accordingly, there has been developed a remote control which allows the user to remotely control the products such as computers without reaching them. However, with a conventional remotely controlled computer, only its main body is controlled by the remote control, requiring a separate remote control for controlling its monitor.

Furthermore, in the installation of a computer system, its monitor is set in a place where a user can easily watch information displayed thereon. In case of its main body, it is located on or under a desk according to the user's choice. Thus, it is difficult for the computer main body to fulfill its function according to its location. Moreover, the conventional remote-controlled computer system has a limited remote control function in which a signal is transmitted from the remote control, the received signal data is analyzed by a microprocessor in the monitor, and the analyzed signal data is transmitted to the PC and monitor as a control signal. Accordingly, when the PC and monitor are controlled through several complicated operations, for example, when the PC and monitor are sequentially turned on, the state of monitor is controlled and a directory is searched in the execution of a PC program, or when a user who does not know a PC well executes an operation through a control sequence, or when a user carries out an operation to a specific state, the control operations must be repeated each time when the user wants to use the PC and monitor.

SUMMARY OF THE INVENTION

Accordingly, the present invention is directed to remotely controlled computer system that substantially obviates one or more of the problems due to limitations and disadvantages of the related art.

An object of the present invention is to provide a remotely controlled computer system, which includes a remote control having a memory for storing operation sequences, and memory short keys, attached to the memory, for inputting the operation sequences to the memory, to display control commands such as memory, cancellation and memorizing sequence on OSD picture and to execute the system into a state its user wants by pushing a memorized number, thereby controlling the computer main body and monitor.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples on which are illustrated in the accompanying drawings.

Figure 1:
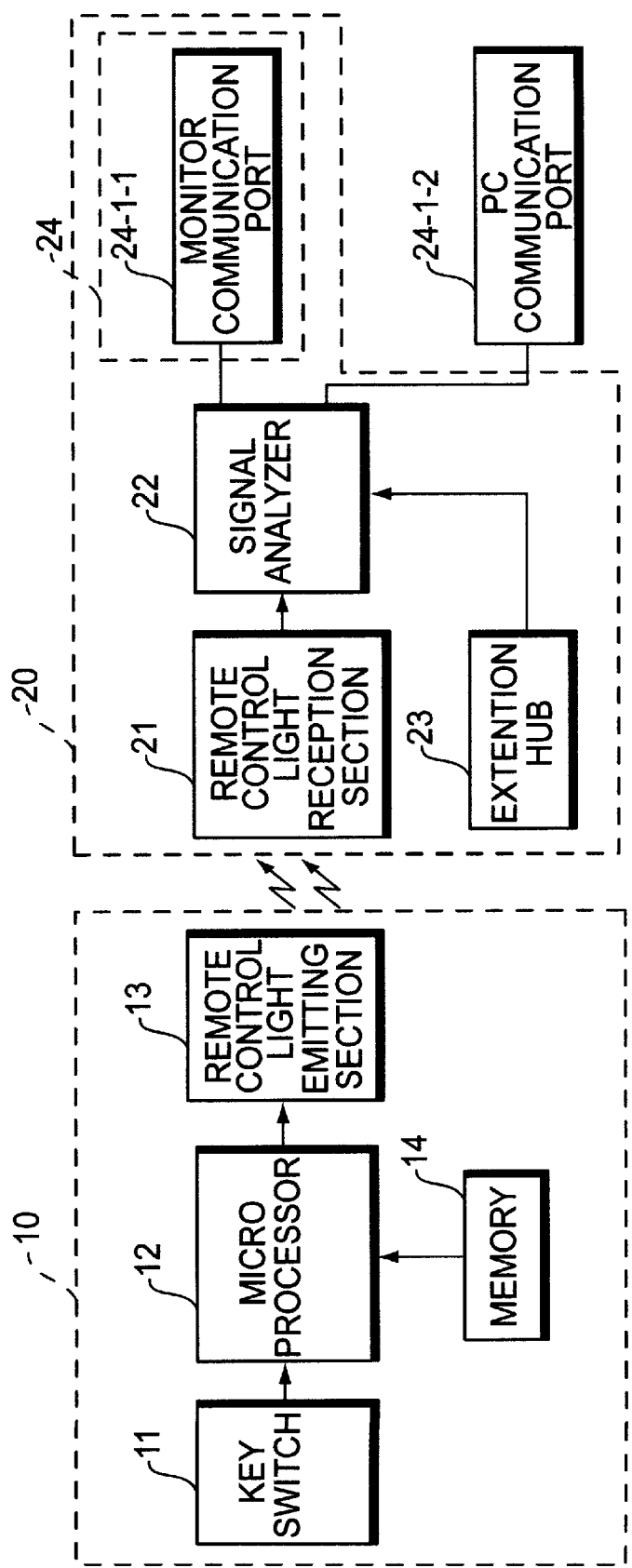
FIG. 1 is a block diagram illustrating a circuit for controlling a monitor and computer using a remote control in accordance with the present invention.

FIG. 1 shows a block diagram of a control circuit of a PC and monitor using a remote control in accordance with the present invention. Referring to FIG. 1, the central circuit includes a remote control 10 for remotely controlling the PC and monitor and outputting a corresponding remote control signal, and monitor 20 for receiving the remote control signal from remote control 10 and processing it, to generate a control signal for controlling the PC and monitor.

Remote control 10 includes a key switch 11 for outputting key signals according to an input by a user, to control the PC and monitor, a remote control microprocessor 12 for receiving the key signal from key switch 11 and encoding it, to generate a remote control signal, a remote-control light emitting section 13 for converting the remote control signal generated by remote control microprocessor 12 into an optical signal and outputting it, and a memory 14 for storing operation sequences.

The operation of the control circuit of the PC and monitor is explained below. A user uses the memory in remote control 10, to avoid performing continuously repeated operations. When the user pushes a key of key switch 11 attached to the exterior case of remote control 10 for the purpose of controlling the PC and monitor, a key signal is outputted from key switch 11 and sent to remote control microprocessor 12. Remote control microprocessor 12 encodes the key signal to generate a remote control signal. Memory 14 memorizes an operation sequence and, when a memory key is pushed, the sequence is displayed on an OSD picture.

The remote control signal generated by remote control microprocessor 12 is sent to remote-control light emitting section 13 of remote control 10. Then, remote control light emitting section 13 converts the remote control signal into an optical signal and wirelessly sends or transmits it to a remote-control light reception section 21 placed in monitor 20. Remote-control light reception section 21 converts the optical signal according to the remote control signal into a current signal which is applied to a signal analyzer 22. A hub signal for extension is applied to signal analyzer 22 through an extension hub 23.

Signal analyzer 22 receives the remote control signal and extension hub signal, analyzes them, and converts them into control communication signals according to the analyzed result, outputting a monitor control signal, PC control signal and extension hub signal. The monitor control signal is sent to a monitor communication port 24-1-1 placed in a second microprocessor 24. Monitor communication port 24-1-1 controls each control circuit (not shown) placed in monitor 20 according to the received monitor control signal. The PC control signal and extension hub signal, outputted from signal analyzer 22, are applied to a PC (not shown) through a PC communication port 24-1-2. The PC controls circuits placed therein according to the PC control signal and extension hub signal.

Figure 2:
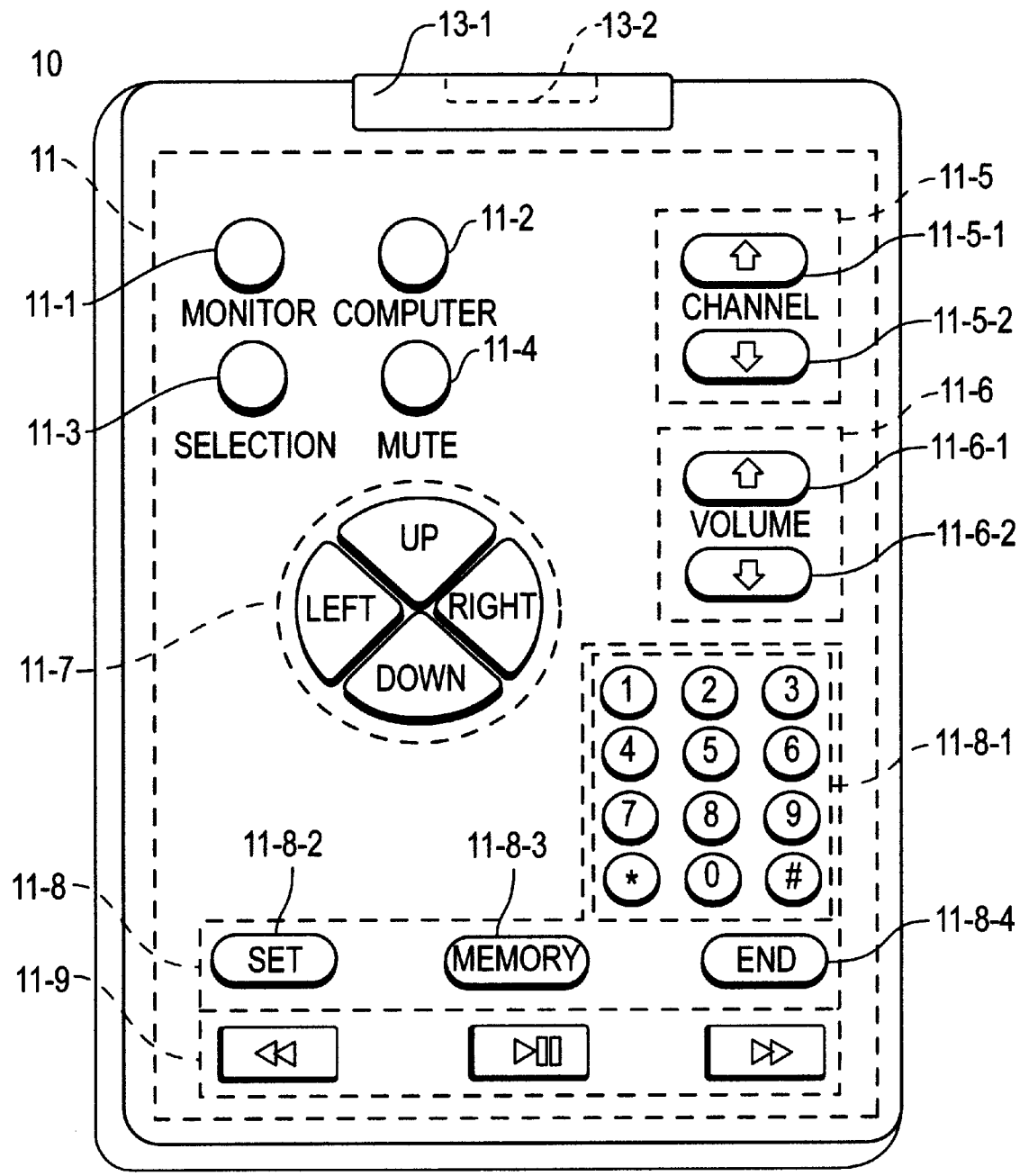
FIG. 2 is a perspective view illustrating the exterior of the remote control in accordance with the present invention.

The exterior of remote control 10 generating the remote control signal is described below with reference to the attached drawing. FIG. 2 is a perspective view of the exterior of the remote control of FIG. 1. Referring to FIG. 2, the remote control includes key switch 11 for outputting a key signal according to a control signal selected by a user, and a cover board 13-1 of a light emitting diode (LED) 13-2 generating an optical signal according to the key signal from key switch 11. Key switch 11 includes a monitor selection button 11-1 for controlling the monitor, a PC selection button 11-2 for selecting the PC, a selection button 11-3 for selecting an OSD picture displayed on the monitor picture, and a mute button 11-4 for muting image signals and sound signals. Key switch 11 also includes channel selection buttons 11-5-1 and 11-5-2 for selecting a channel when a TV card is executed in the PC, volume control buttons for controlling the volume when the TV card or sound card is executed, a cursor moving button 11-7 for moving a cursor on the OSD picture displayed on the monitor picture, and a memory button 11-8 for storing an image signal or sound signal displayed on the monitor when it is repeatedly processed.

Memory button 11-8 includes short key 11-8-1 for, when an image signal is repeatedly processed, memorizing its processing sequence. When a sequence is memorized as a certain number by using short key 11-8-1, this is displayed on the OSD picture. Then, cursor moving key 11-7 is controlled to move the cursor to a desired number, and a short key setting completion key 11-8-4 is pushed, memorizing the sequence. To start to memorize a new sequence of a desired number, a memory key 11-8-3 is pushed, and then short key setting key 11-8-2 is pushed. Remote control 10 further includes a button 11-9 for playing, rewinding and searching moving pictures.

Figure 3:
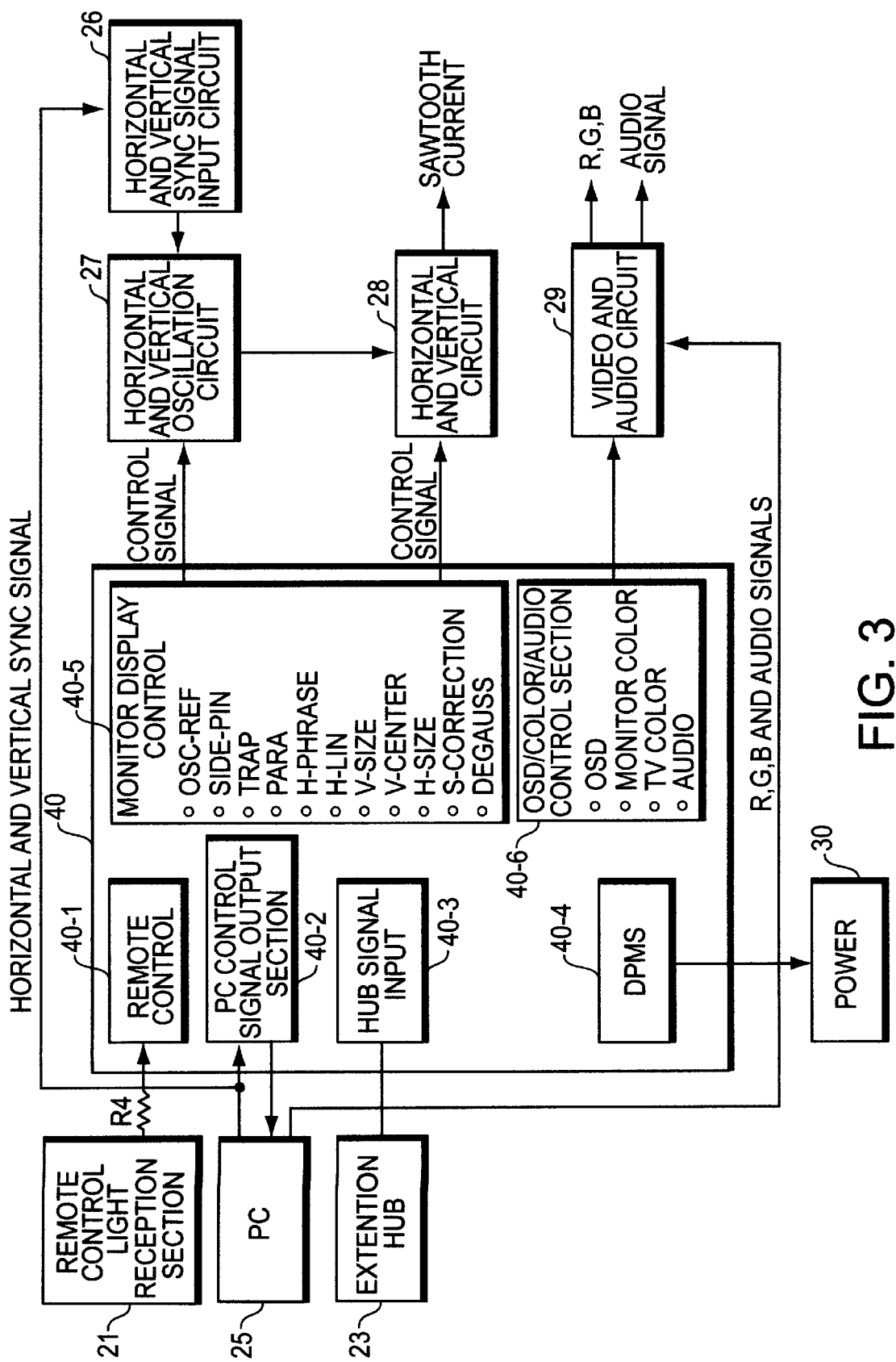
FIG. 3 is a block diagram illustrating the inner circuit of the monitor in accordance with an embodiment of the present invention.

An embodiment of the circuit for remotely controlling the monitor and PC using one microprocessor is explained below with reference to the attached drawing. FIG. 3 is a block diagram of the inner circuit of the monitor according to an embodiment of the present invention. Referring to FIG. 3, the monitor inner circuit includes: a remote-control light reception section 21 for receiving an optical signal to the remote control signal sent from remote control 10 (shown in FIG. 1) and converting it into a remote control data signal; PC 25 for generating horizontal and vertical synchronous signals for synchronizing an image signal; extension hub 23 for extensionally connecting a mouse or keyboard to the monitor; a microprocessor 40 for receiving the remote control data signal according to the remote control signal applied from the remote control light reception section 21 and an extension hub signal applied from extension hub 23, and analyzing them, to output a monitor control signal and PC control signal; a horizontal and vertical synchronous signals input circuit 26 for receiving the horizontal and vertical synchronous signals from PC 25 and outputting them; a horizontal and vertical oscillation circuit 27 for receiving the horizontal and vertical synchronous signals from the horizontal and vertical synchronous signals input circuit 26 and a control signal from microprocessor 40, and generating horizontal and vertical oscillation signals; a horizontal and vertical circuit 28 for receiving the horizontal and vertical oscillation signals from horizontal and vertical oscillation circuit 27 and a control signal from microprocessor 40, controlling the monitor picture and generating a corresponding sawtooth current; a video and audio circuit 29 for receiving and outputting an OSD control signal, color control signal and audio control signal from microprocessor 40 and an image signal (R,G,B) and audio signal from PC 25; and a power circuit 30 for receiving a DPMS signal from microprocessor 40 and reducing power consumed in the monitor.

Microprocessor 40 includes: a remote control section 40-1 for receiving the remote control data signal from remote control light reception section 21 through a resistor R4, analyzing it, and outputting the monitor control signal and PC control signal; a PC control signal output section 40-2 for receiving and outputting the PC control signal when the remote control data signal is the PC control signal; a hub signal input section 40-3 for receiving the extension hub signal from extension hub 23, analyzing and outputting it; a DPMS section 40-4 for receiving a DPMS enable signal according to the monitor control signal when the remote control data signal is the monitor control signal, and outputting a DPMS mode signal for reducing the consumption power; a monitor picture control section 40-5 for receiving a monitor picture control signal according to the monitor control signal when the remote control data signal is the monitor control signal, and outputting a control signal for controlling the monitor picture; and an OSD/color/audio control section 40-6 for receiving an OSD/color/audio control signal according to the monitor control signal when the remote control data signal is the monitor control signal, and outputting OSD control signal, color control signal and audio control signal.

The operation of the remote controlled computer system of the invention is explained below. Remote control 10 generates an optical signal according a remote control signal when it is used by a PC user. The optical signal according to the remote control signal is sent to remote control light reception section 21 which converts the optical signal into a pulse signal and outputs it as a remote control data signal. The remote control data signal is sent to remote control section 40-1 in microprocessor 40 and analyzed if it is the monitor control signal or PC control signal. When the control signal is a PC control signal power-on signal, this power-on signal according to the PC control signal is applied to PC control signal output section 40-2. PC 25 receives the power-on signal and drives a power supply circuit (not shown), turning on itself.

When the remote control data signal analyzed by remote control section 40-1 is a signal for executing a software, PC control section 40-2 receives a software execution command and sends it to a CPU (not shown) of PC 25, to execute a program according to the software execution command. When the remote control data signal is analyzed as the monitor control signal by remote control section 40-1, the DPMS enable signal for enabling the DPMS function is applied to DPMS section 40-4 which enables the DPMS mode according to the received DPMS enable signal. Upon the enabling of DPMS mode function, microprocessor 40 detects the horizontal and vertical synchronous signals sent from PC 25. According to the detection result, DPMS section 40-4 sends the DPMS mode signal, that is, suspend a mode signal, a standby signal and a power-off mode signal, to power circuit 30, to reduce the power consumed in the monitor according to each DPMS mode.

When the remote control data signal analyzed by remote control section 40-1 is the monitor picture control signal according to the monitor control signal, the monitor picture control signal is applied to monitor picture control section 40-5 which outputs various monitor picture control signals for controlling the monitor picture according to the applied monitor picture control signal. The various monitor picture control signals are, for example, a reference oscillation signal OSC-REF, a side pin signal SIDE-PIN, a trapezoid signal TRAP, a parabola signal PARA, a horizontal phase signal H-PHASE, a horizontal linear signal H-LIN, a vertical size signal V-SIZE, a vertical center signal V CENTER, a horizontal size signal H-SIZE, a side pin correction signal S-CORRECTION and a degaussing signal DEGAUSS.

Horizontal and vertical synchronous signals input circuit 26 receives the horizontal and vertical synchronous signals from PC 25 and sends them to horizontal and vertical oscillation circuit 27. Horizontal and vertical oscillation circuit 27 receives the horizontal and vertical synchronous signals and control signals outputted from monitor control section 40-5 of microprocessor 40, to generate horizontal and vertical oscillation signals, sending them to horizontal and vertical circuit 28. Horizontal and vertical circuit 28 receives the horizontal and vertical oscillation signals and control signal outputted from monitor picture control section 40-5 of microprocessor 40, to generate horizontal and vertical sawtooth waves which are applied to horizontal and vertical deflection yokes (not shown), synchronizing an image signal (R,G,B) outputted from PC 25, and displaying it on the monitor picture.

When the monitor control signals outputted from remote control section 40-1 are OSD, monitor color, TV color and audio control signals for controlling the OSD, color and audio signals, these signals are applied to OSD/color/audio section 40-6 which sends the applied control signals to video and audio circuit 29. Video and audio circuit 29, which receives the control signals, receives the image signal (R,G,B) and sound signal from PC 25, and amplifies them. The image signal (R,G,B) amplified by video and audio circuit 29 is displayed on the monitor picture through a CRT (not shown), and the amplified audio signal is outputted as sound waves through a speaker (not shown).

Hub signal input section 40-3 of microprocessor 40 receives the extension hub signal outputted from extension hub 23 for extensionally connecting the keyboard or mouse to the monitor. When the extension hub signal is the PC control signal, it is applied to PC 25 through PC control signal output section 40-2, to control or execute a hardware or software in PC 25. When the extension hub signal is the monitor control signal, it is applied to monitor picture control section 40-5 and OSD/color/audio control section 40-6, controlling the monitor.

Figure 4:
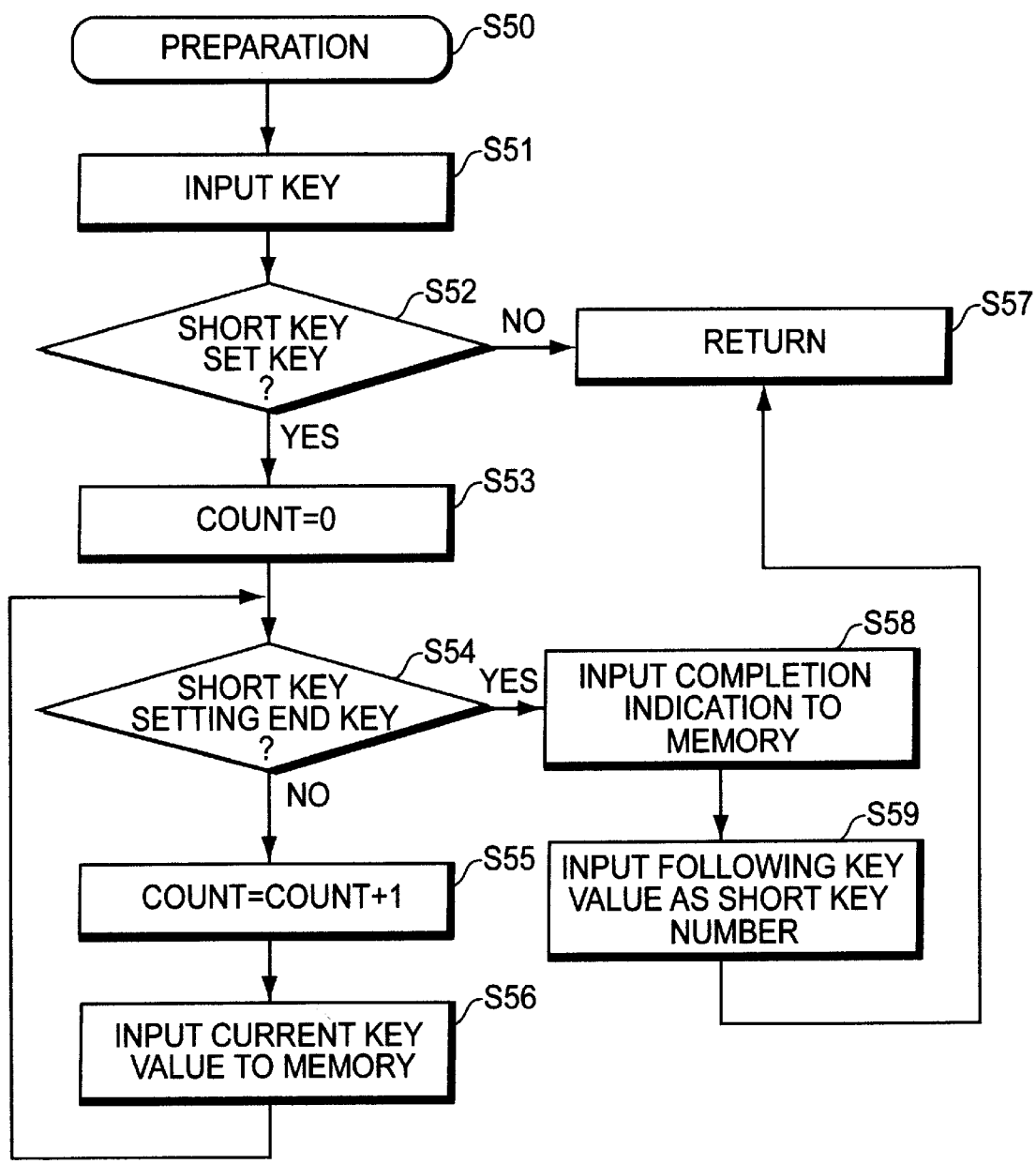
FIG. 4 is a flow diagram illustrating a method of setting short keys in accordance with the present invention.

FIG. 4 is a flow diagram for setting the short key for controlling the monitor and PC according to the present invention. Referring to FIG. 4, the user inputs a key for setting a short key (shown in FIG. 2) for remotely controlling the monitor and PC using the remote control (S51). If the input key is a short key setting key (S52), then a counter is initialized (S53) otherwise, the process returns (S57). When the counter is initialized, it is judged if the following input key is the short key setting completion key (S54). When it is the short key setting completion key, the completion indication is inputted to the memory (S58), and the following key value is inputted as a short key number (S59), returning to the initial state (S57). When it is not the short key setting completion key, the currently inputted count value is increased (S55), the inputted key value is stored in the memory (S56), and then returning to step S54 to confirm if the following input key is the short key setting completion key.

Figure 5:
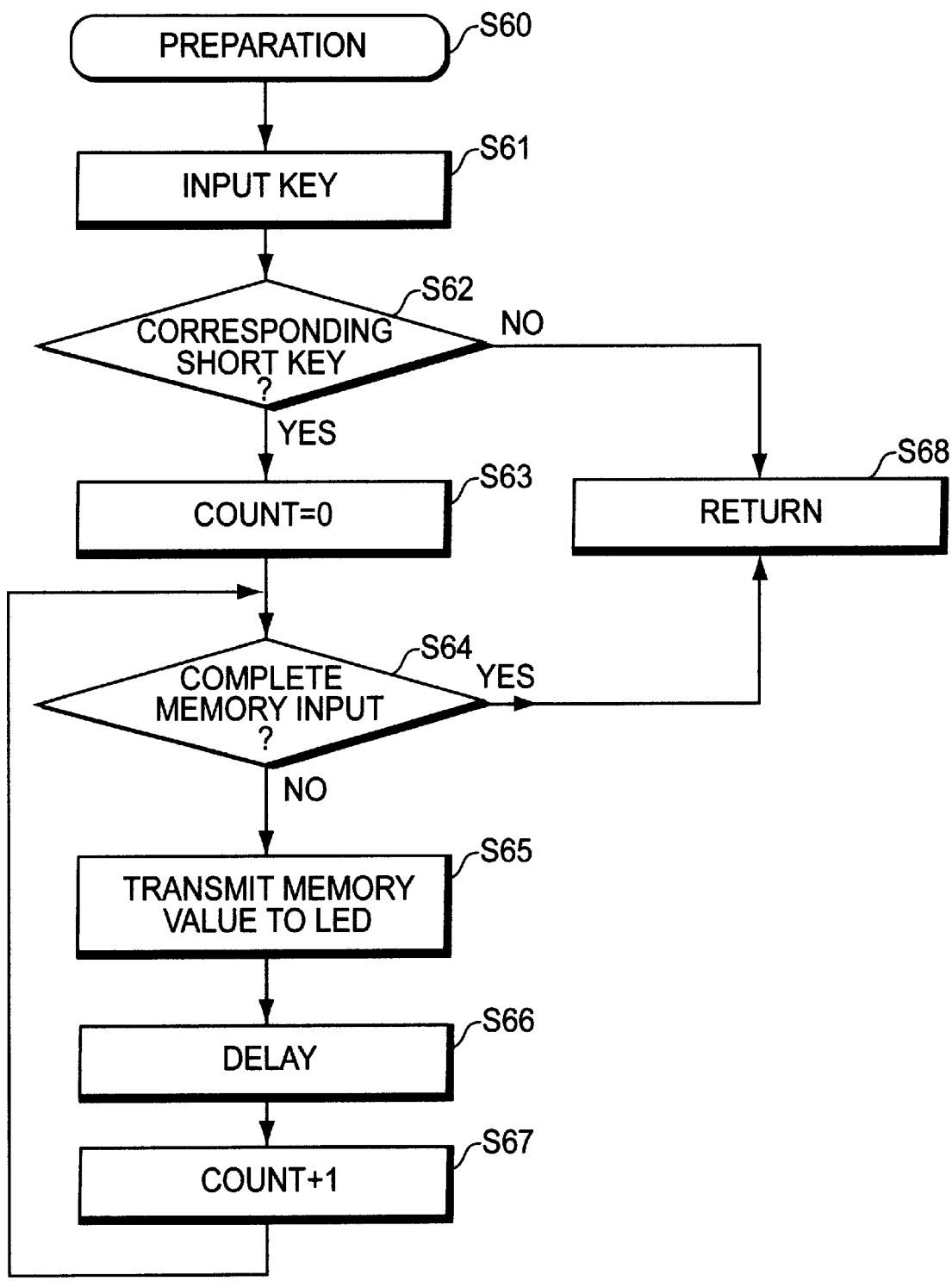
FIG. 5 is a flow diagram illustrating a method of transmitting data using the short keys set in accordance with the present invention.

FIG. 5 is a flow diagram explaining the data transmission method using the short key according to the present invention. Referring to FIG. 5, when a short key for transmitting data is inputted (S61), if the inputted key is a corresponding short key (S62), the initial value of the counter for the short key becomes 0 (S63). When the initial value of the counter becomes 0, it is judged if memorizing is completed or not (S64). When memorizing is completed, the process returns to the initial state (S68), and, when it is not, the memory of the corresponding short key is transmitted to the remote-control light emitting section (S65). That is, a control signal is output. As described above, when the control signal is output to the remote-control light emitting section the data output value according to the output of control signal is delayed (S66), and this delayed output value is gradually increased (S67) returning to confirm if memorizing is completed or not.

It will be apparent to those skilled in the art that various modifications and variations can be made in the remotely controlled computer system of the present invention without departing from the spirit or scope of the invention. Thus, it is intended that the present invention cover the modifications and variations of this invention provided they come within the scope of the appended claims and their equivalents.

What is claimed is:

1. A remotely controlled computer, comprising:

a remote control apparatus including a key switch for outputting key signals according to inputs by a user, a microprocessor for receiving key signals output from the key switch and encoding the received key signals to generate a remote control signal, a remote control light emitting section for converting the remote control signal generated by the microprocessor into an optical signal for wireless transmission of the optical signal, a memory for storing an operation sequence corresponding to key signals output from the key switch, and a short key for outputting by remote control the operation sequence;

a monitor including a light reception section for receiving sequential key values corresponding to the operation sequence output from the remote control apparatus, the monitor being controlled when a control value input through the light reception section is a monitor control signal, and the monitor sending a personal computer (PC) control signal to a personal computer (PC) when a control value input through the light reception section is a personal computer (PC) control signal; and a personal computer (PC) for receiving the personal computer (PC) control signal sent from the monitor.

2. The remotely controlled computer as claimed in claim 1, further comprised of the key switch comprising:

a short key for memorizing the operation sequence;

a short key setting key for storing in the memory the operation sequence; and a short key setting completion key for indicating completion of short key setting.

3. A method of transmitting data using a short key in a remotely controlled computer system, comprising the steps of:

providing a remote control apparatus for the computer system, the remote control apparatus including a memory and a short key for transmitting data;

when a short key of the remote control apparatus is input in order to transmit data, judging if an input key is a corresponding short key for transmitting data for an operation set in the remote control apparatus;

setting a currently input initial value of a counter of the remote control apparatus to 0 when the input key is the corresponding short key for transmitting data for the operation, and then transmitting the operation of the corresponding short key from the memory to a remote control light emitting section of the remote control apparatus when a process for transmitting the operation is not completed;

increasing a current count of the counter when data transmission for the operation is delayed by a period of time required for the data transmission for the operation; and providing a monitor including a light reception section for receiving each key value corresponding to the operation for the corresponding short key for transmitting data when output from the remote control apparatus, the monitor being controlled when a control value input through the light reception section is a monitor control signal, and the monitor sending a personal computer (PC) control signal to a personal computer (PC) when a control value input through the light reception section is a personal computer (PC) control signal.

4. The method of claim 3, further comprising the remote control light emitting section including a light emitting diode (LED).

5. The method of claim 3, further comprising the step of setting a short key for transmitting data in the remotely controlled computer system, the step of setting a short key for transmitting data comprising the sub-steps of:

providing the remote control apparatus for the computer system to include a short key for memorizing a corresponding operation in sequence, a short key setting key for storing in the memory the corresponding operation, and a short key setting completion key for indicating completion of short key setting;

setting a count of a currently input key value to 0 when an input key of the remote control apparatus is the short key setting key;

inputting a completion indication to the memory when an input key of the remote control apparatus is the short key setting completion key, and then inputting a following key value of an input key of the remote control apparatus as a short key number for the corresponding operation; and increasing a current count of a currently input key value when an input key is not the short key setting completion key, and then inputting an increased key value to the memory.

6. The method of claim 5, further comprised of the remote control light emitting section including a light emitting diode (LED).

* * * * *